(12) United States Patent
Zhao

(10) Patent No.: US 11,141,742 B2
(45) Date of Patent: Oct. 12, 2021

(54) COLD WEATHER LOW FLOW MINIATURE SPRAY NOZZLE ASSEMBLY AND METHOD

(71) Applicant: DLHBOWLES, INC., Canton, OH (US)

(72) Inventor: Chunling Zhao, Ellicott City, MD (US)

(73) Assignee: DLHBOWLES, INC., Canton, OH (US)

( * ) Notice: Subject to any disclaimer, the term of this patent is extended or adjusted under 35 U.S.C. 154(b) by 57 days.

(21) Appl. No.: 16/255,326

(22) Filed: Jan. 23, 2019

(65) Prior Publication Data
US 2019/0151865 A1 May 23, 2019

Related U.S. Application Data

(63) Continuation-in-part of application No. 15/759,242, filed as application No. PCT/US2017/062044 on Nov. 16, 2017, now Pat. No. 10,987,681.
(Continued)

(51) Int. Cl.
*B05B 1/04* (2006.01)
*B05B 1/08* (2006.01)
(Continued)

(52) U.S. Cl.
CPC ............ *B05B 1/16* (2013.01); *B05B 1/046* (2013.01); *B05B 1/14* (2013.01); *B60S 1/00* (2013.01);
(Continued)

(58) Field of Classification Search
CPC .......... B05B 1/04; B05B 1/042; B05B 1/044; B05B 1/046; B05B 1/08; B05B 1/14;
(Continued)

(56) References Cited

U.S. PATENT DOCUMENTS 3,085,754 A 4/1963 Thompson
3,974,966 A * 8/1976 Watkins ................. B05B 1/046
239/590.3
(Continued)

FOREIGN PATENT DOCUMENTS

DE 202010015304 2/2011
EP 0329449 8/1989
(Continued)

OTHER PUBLICATIONS

Innternational Searching Authority, European Patent Office, International Search Report and Written Opinion for PCT/US2019/014746, dated Apr. 30, 2019.

*Primary Examiner* — Darren W Gorman
(74) *Attorney, Agent, or Firm* — McDonald Hopkins LLC

(57) ABSTRACT

A low flow compact spray head design for cleaning applications, especially for camera lens wash includes a miniature spray nozzle head which is about 5 mm in diameter or less for a single direction spray nozzle and about 8 mm in diameter of less for a nozzle with multiple sprays. The washer fluid is fed from the bottom of nozzle along a flow axis and is separated into two flows via two power nozzles or inlets which turn the flows 90° to become opposing jets impinging upon each other inside an interaction region. Uniform stream lines are generated by the two direct facing jets and converge at the nozzle throat to become a uniform spray fan, which is on a plane perpendicular to the axis of cylindrical nozzle head. This fluidic circuit design enables a miniature size low flowrate nozzle to operate well consistently with low flow rate (e.g., a flow rate of about 150 mL/min to about 300 mL/min at 25 psi, or even a flow rate of about 250 mL/min at 25 psi or above, at a viscosity of about 25 CP) at cold temperate (−4° F. or lower) with 50 percent ethanol. This nozzle design is capable of generating (Continued)

two or more different oriented spray fans (e.g., fans spraying in opposing directions) from one single nozzle.

15 Claims, 13 Drawing Sheets

Related U.S. Application Data

(60) Provisional application No. 62/620,826, filed on Jan. 23, 2018, provisional application No. 62/423,016, filed on Nov. 16, 2016.

(51) Int. Cl.
*B05B 1/16* (2006.01)
*B05B 1/14* (2006.01)
*B60S 1/00* (2006.01)
*B60S 1/56* (2006.01)

(52) U.S. Cl.
CPC . *B60S 1/56* (2013.01); *B05B 1/04* (2013.01); *B05B 1/08* (2013.01)

(58) Field of Classification Search
CPC ...... B05B 1/16; B60S 1/00; B60S 1/02; B60S 1/52; B60S 1/56
See application file for complete search history.

(56) References Cited

U.S. PATENT DOCUMENTS

| | | | | |
|---|---|---|---|---|
| 4,185,777 A | * | 1/1980 | Bauer | B05B 1/08 239/394 |
| 4,828,182 A | | 5/1989 | Haruch | |
| 5,820,034 A | * | 10/1998 | Hess | B05B 1/08 239/589.1 |
| 7,648,087 B2 | * | 1/2010 | Horn | B05B 1/02 239/597 |
| 7,965,336 B2 | | 6/2011 | Bingle | |
| 8,430,108 B2 | * | 4/2013 | Bettenhausen | B60S 1/52 134/172 |
| 8,671,504 B2 | | 3/2014 | Ono | |
| 2017/0036650 A1 | | 2/2017 | Hester | |
| 2017/0203310 A1 | * | 7/2017 | Ruckwied | B05B 1/042 |

FOREIGN PATENT DOCUMENTS

| | | |
|---|---|---|
| GB | 2298808 | 9/1996 |
| WO | WO2016/025930 | 2/2016 |
| WO | WO2017/070246 | 4/2017 |

\* cited by examiner

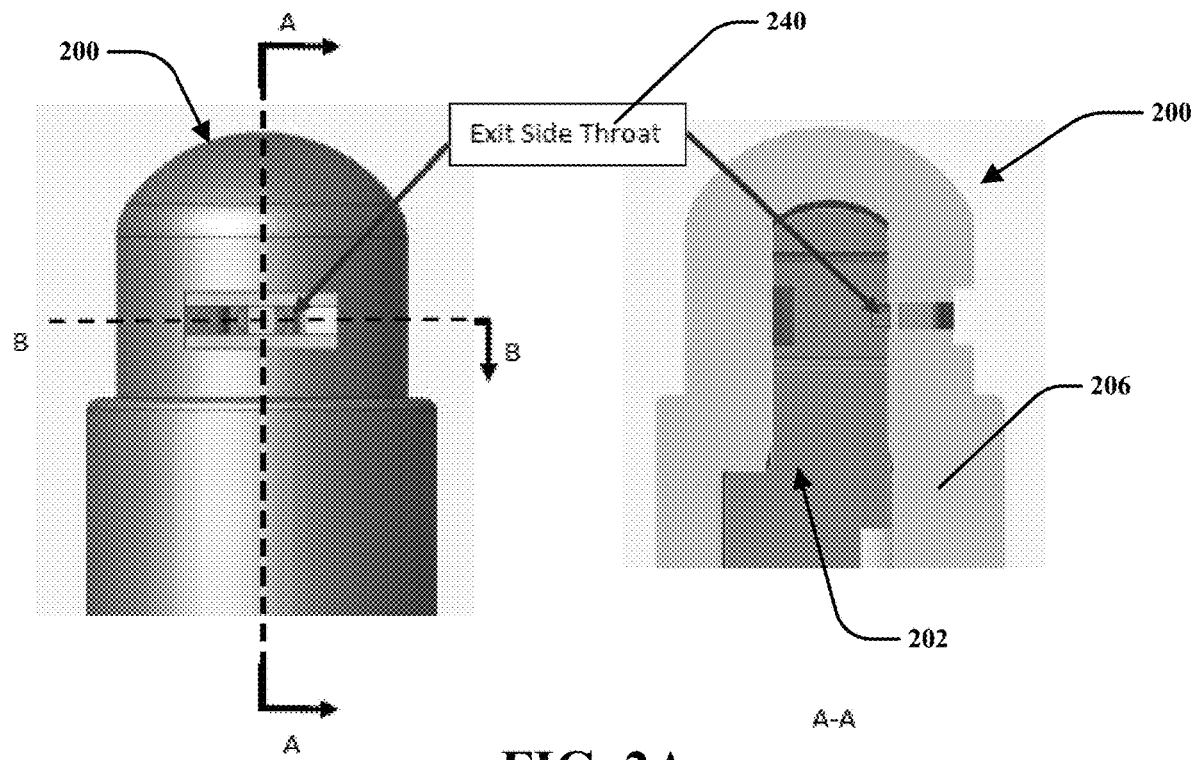
FIG. 2A
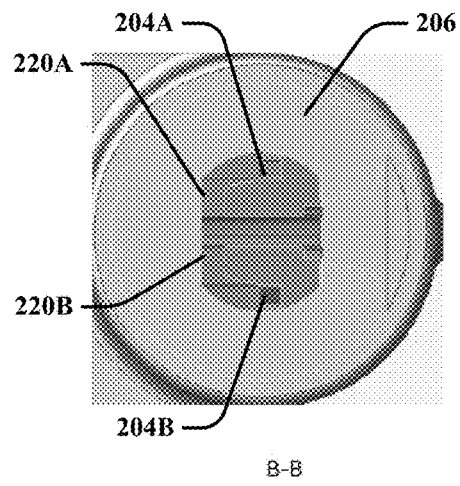 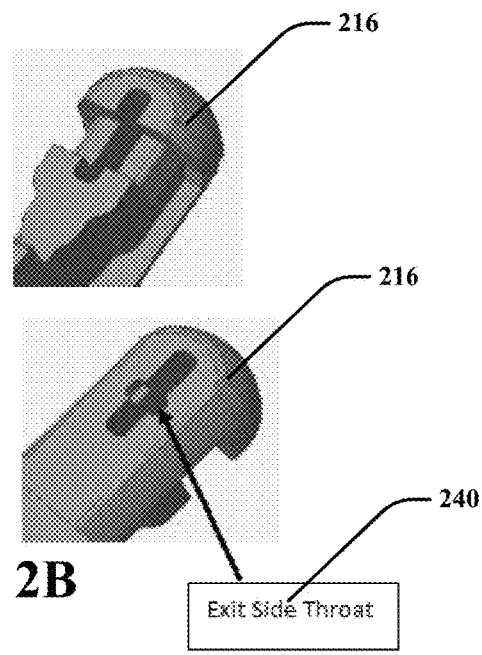
FIG. 2B

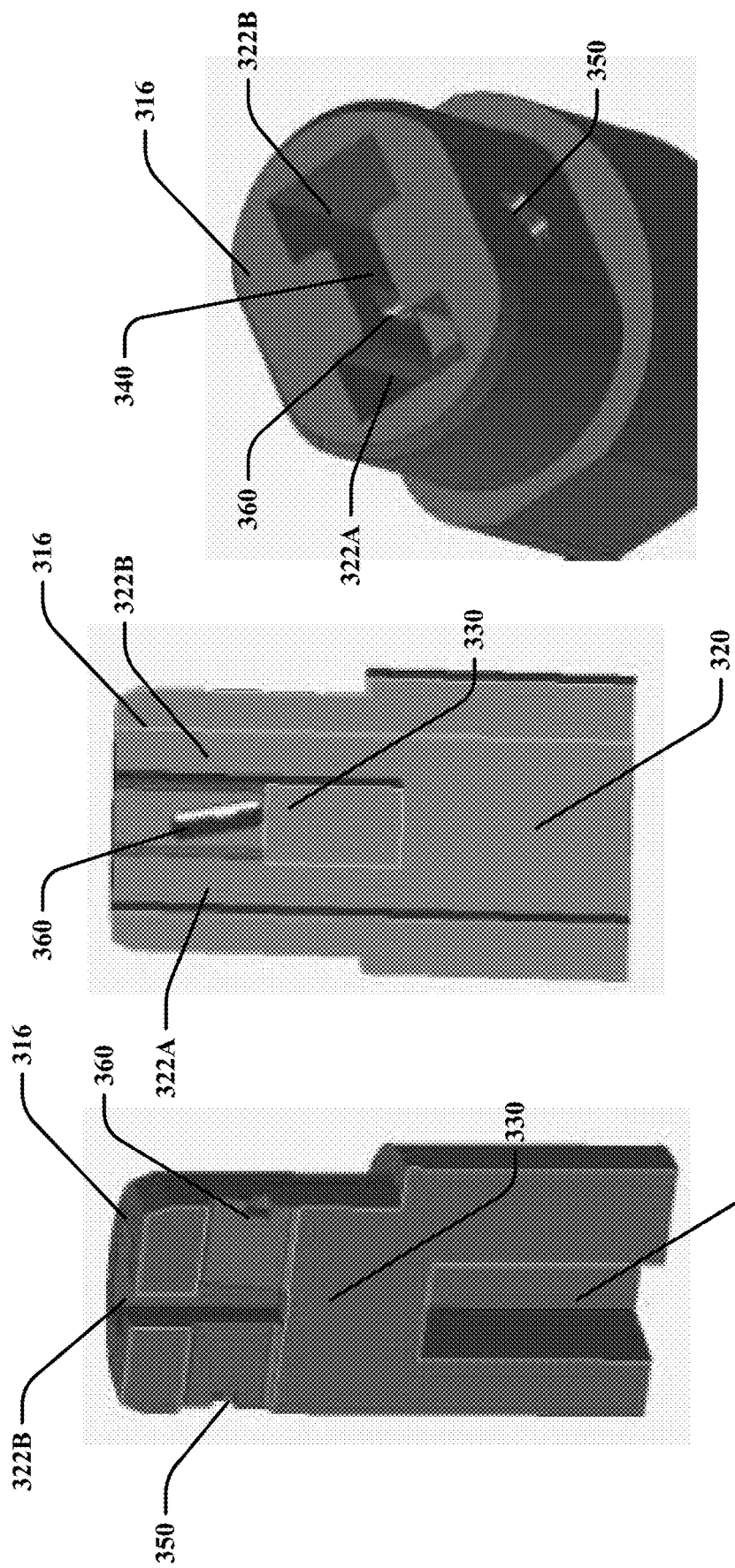

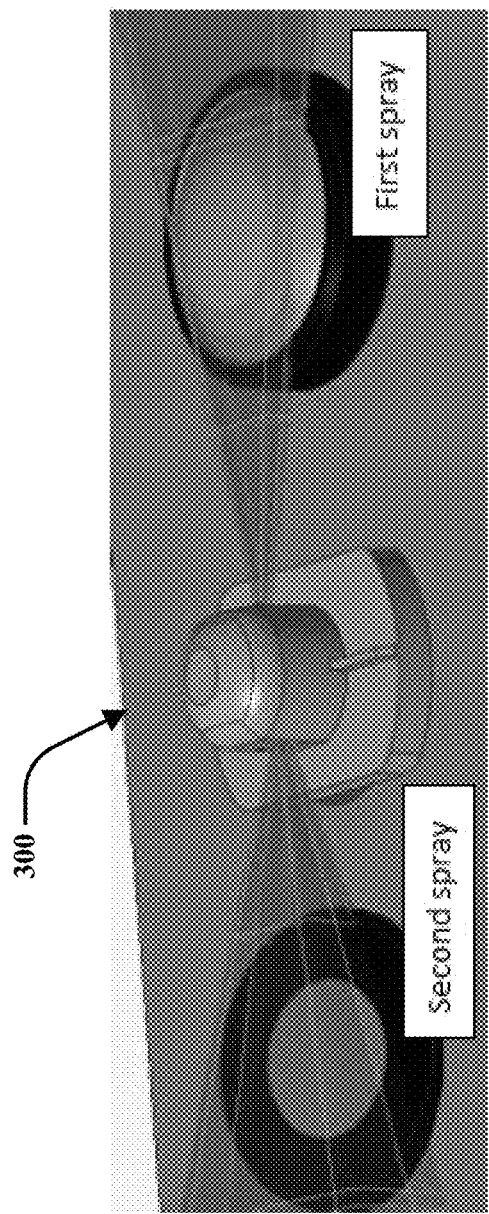
FIG. 8A
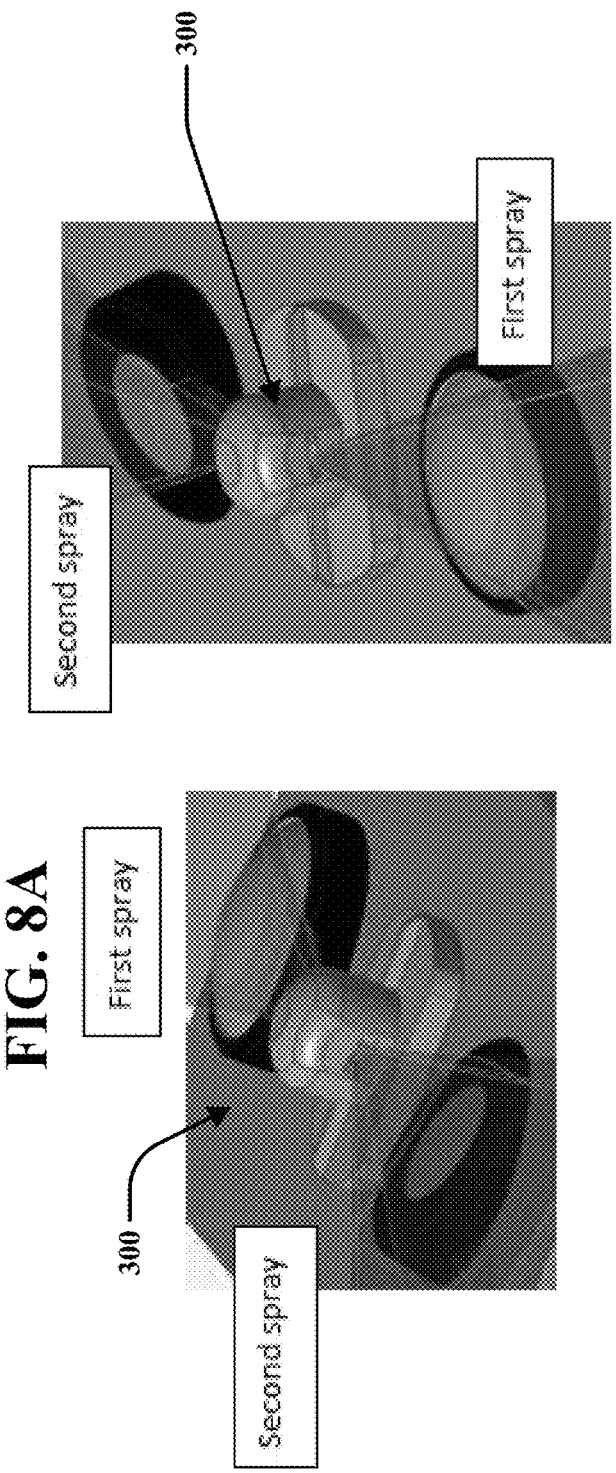
FIG. 8C
FIG. 8B

COLD WEATHER LOW FLOW MINIATURE SPRAY NOZZLE ASSEMBLY AND METHOD

CROSS-REFERENCE TO RELATED APPLICATIONS

This application claims priority to and benefit of U.S. Provisional Application No. 62/620,826 entitled "COLD WEATHER LOW FLOW MINIATURE SPRAY NOZZLE ASSEMBLY AND METHOD," filed on Jan. 23, 2018, which is hereby incorporated by reference in its entirety. This application is also a continuation-in-part of U.S. Utility application Ser. No. 15/759,242 entitled LOW-FLOW MINIATURE FLUIDIC SPRAY NOZZLE ASSEMBLY AND METHOD," filed on Mar. 12, 2018 which is a national phase entry application of International Application No. PCT/US2017/62044 filed on Nov. 16, 2017 which claims priority to U.S. Provisional Application No. 62/423,016 filed on Nov. 16, 2016.

This application is also related to the following commonly owned patent applications: PCT application number PCT/US16/57762 entitled "Micro-sized Structure and Construction Method for Fluidic Oscillator Wash Nozzle" (now WIPO Publication WO 2017/070246), PCT application number PCT/US15/45429, entitled "Compact Split-lip Shear Washer Nozzle", (now WIPO Publication WO 2016/025930), and U.S. application Ser. No. 15/303,329, entitled "Integrated automotive system, compact, low profile nozzle assembly, compact fluidic circuit and remote control method for cleaning wide-angle image sensor's exterior surface", (now US Published Application US2017/0036650), the entire disclosures of which are incorporated herein by reference.

FIELD OF THE DISCLOSURE

The present disclosure relates to very small or compact spray nozzle assemblies, and particularly for miniaturized automotive washer nozzles for cleaning external surfaces such as external camera lens surfaces.

BACKGROUND

Fluidic type washer nozzles are well known for high efficiency (big coverage, high speed with low flow rate) spray performance. However, the major limitation of fluidic nozzle is that the package size needs to be large enough (for example, from feed to exit need to be at least 6 mm for most of fluidic circuits).

For some applications, package size is a big concern due to very limited available space. Jet spray nozzles were commonly used in such applications. Because of narrow spray pattern, jet spray nozzles need higher flow rate or longer duration time to clean up a glass or external lens surface. Jet nozzles spray nozzles have smaller package size than fluidic nozzles, but do not have effective spray patterns.

Some shear nozzles can be made to generate useful sprays for washing and can be made adjustable with ball insert in nozzle housing, but size constraints have remained a problem. Automotive designers want very compact nozzle assemblies for automotive washer nozzles, but also want an even spray distribution. Automotive OEMs also want a nozzle which is very economical and versatile. For example, exterior trim assemblies often combine many functions, such as the CHMSL light assemblies, which can include other features such as external cameras, but cleaning the lenses on those cameras becomes problematic, if the designer's vision for exterior trim is to be preserved.

Shear nozzles are sometimes used for small package-size applications, and they perform well for geometries where a spray fan is aligned with the axis of the feed hole, but poorly for geometries where the spray fan perpendicular to the axis of the feed hole. Other challenges include spray aim & tooling complications which become major constraints for proposed designs including shear nozzles, and so is washer spray performance when spraying cold, high viscosity fluids. FIGS. 1A through 1G illustrate prior art in the area of vehicle window wash and camera wash systems and one of applicant's prior compact washer nozzle members 100 (from the references incorporated above).

Cold weather spray performance is another difficult objective, but solving cold weather washing spray generation problems in a miniaturized nozzle assembly is an extremely desirable objective, especially for vehicle camera wash nozzle applications. Under cold temperature conditions, good spray coverage on the vehicle camera lens is very important to remove dirt, ice or salt stains from camera lens or similar sensor surfaces.

Thus, there is a need for a practical, economical, readily manufactured and very compact automotive camera lens washer nozzle configuration and cleaning method.

SUMMARY

Accordingly, it is one object of the present disclosure to overcome the above mentioned difficulties by providing a new way to integrate the desirable cold weather, low flow, high viscosity spray orientation features with a very compact (e.g., 5 mm diameter) nozzle assembly spray head.

In accordance with the present disclosure, a new small (e.g., 5 mm diameter) shear nozzle is optimized to provide the desired sprays from a small spray head profile. The shear nozzle geometry of the present disclosure generates uniform spray fan perpendicular to the axis of feed hole at a low washer fluid flow rate, while providing excellent cold performance, and easy manufacturability. Moreover, this nozzle design is capable of spraying two differently oriented fans from one single nozzle.

A low flow compact spray head design for cleaning applications is especially well suited for auto camera lens wash applications and includes a miniature spray nozzle head which is about 5 mm in diameter or less for a single direction spray nozzle and about 8 mm in diameter of less for a nozzle with multiple sprays. The washer fluid is fed from the bottom of nozzle housing along a vertical interior lumen's flow axis, then the pressurized fluid separates into two flows. Those two flows are fed into two power nozzle inlets which make the flows turn 90°, become two jets facing each other inside an interaction region. Uniform stream lines are generated by the two direct facing jets and converge at the nozzle throat to become a uniform spray fan, which is on a plane perpendicular to the axis of cylindrical nozzle head. This fluidic circuit design enables a miniature size low flowrate nozzle to operate consistently with low flow rate (e.g., a flow rate of about 150 mL/min to about 300 mL/min at 25 psi, or even a flow rate of about 250 mL/min at 25 psi or above, at a viscosity of about 25 CP) at various temperatures including cold temperatures (i.e., about −4° F. or lower) with 50 percent ethanol. This nozzle design is capable of generating two or more different oriented spray fans (e.g., fans spraying in opposing directions) from one single nozzle.

The nozzle assembly method of the present disclosure provides a new way to assemble a 5 mm diameter spray nozzle with variable spray fan in a two-piece nozzle assembly. The spray fan angle may be selected to be in the range of about 15° to about 70°. Spray aim angles may be selected to be in the range of about −15° to about +15°. The system operates well with washer fluid flow rates of around about 200 mL/min to about 600 mL/min at 25 psi. The nozzle assembly and method of the present disclosure provide a lens washer system capable of operating effectively with a low flow rate (e.g., a flow rate of about 150 mL/min to about 300 mL/min at 25 psi, or even a flow rate of about 250 mL/min at 25 psi or above, at a viscosity of about 25 CP) and the spray nozzle performs very well with high viscosity washer fluid (e.g., 50 percent ethanol) at various temperatures including cold temperatures (i.e., about −4° F. or lower).

The nozzle assembly and method of the present disclosure includes a two-piece spray nozzle assembly where both housing and insert members are economically manufacturable for high volume robust production. The nozzle assembly and method of the present disclosure may be implemented with a one nozzle spray or with two or more variously oriented spray fans. In a multi-spray embodiment, one nozzle assembly is configurable to generate two separate spray fans aimed along diverging or opposing spray axes to clean separate and differently oriented (e.g., camera lens) surfaces.

The above and still further objects, features and advantages of the present disclosure will become apparent upon consideration of the following detailed description of a specific embodiment thereof, particularly when taken in conjunction with the accompanying drawings, wherein like reference numerals in the various figures are utilized to designate like components.

BRIEF DESCRIPTION OF THE DRAWINGS

FIG. 2A illustrates a spray nozzle according to one embodiment of the present disclosure and a cross-sectional side view through line A-A of FIG. 2A;

FIG. 2B illustrates a cross-sectional top view through line B-B of FIG. 2A illustrating an interaction region of a spray nozzle and an insert member separate from a housing according to one embodiment of the present disclosure;

FIG. 6A is a perspective cross sectional view of an insert for the spray nozzle according to another embodiment of the present disclosure;

FIG. 6B is an opposite cross sectional view of an insert for the spray nozzle according to another embodiment of the present disclosure;

FIG. 6C is a top perspective view of the insert for the spray nozzle;

FIG. 8A illustrates a multi-spray nozzle assembly according to one embodiment of the present disclosure in operation;

FIG. 8B illustrates a multi-spray nozzle assembly according to one embodiment of the present disclosure in operation;

FIG. 8C illustrates a multi-spray nozzle assembly according to one embodiment of the present disclosure in operation.

DETAILED DESCRIPTION OF THE DISCLOSURE

Figure 1A:
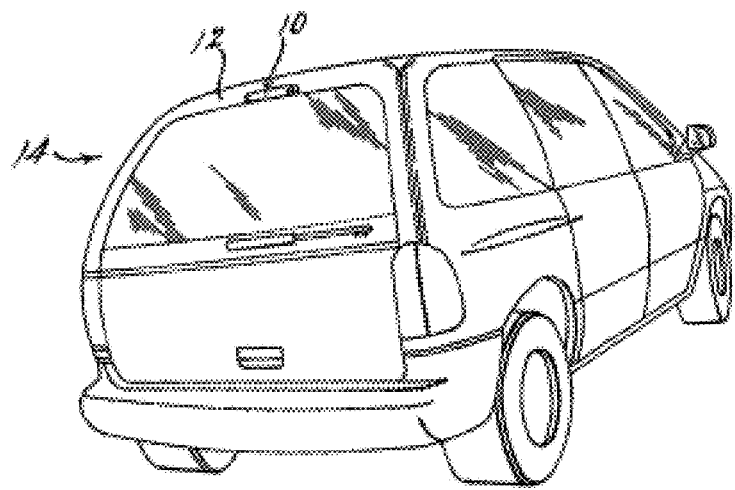
FIGS. 1A and 1B illustrate a vehicle with a back-up camera system as disclosed in U.S. Pat. No. 7,965,336.
Figure 1B:
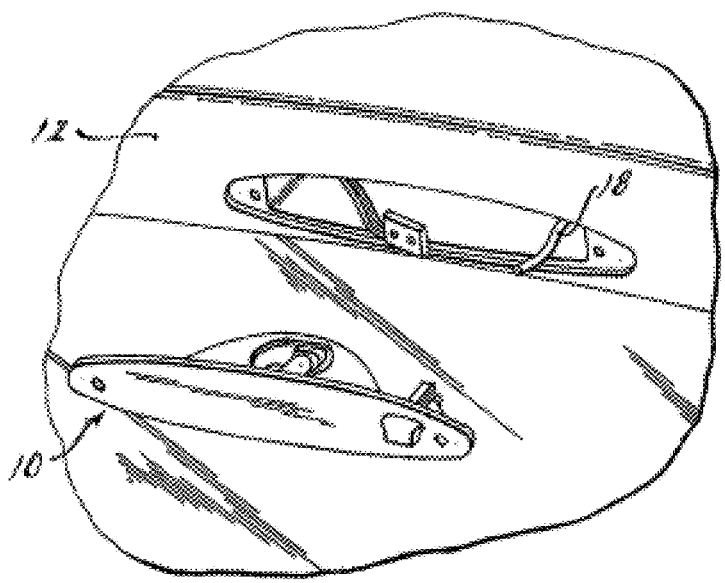
Figure 1C:
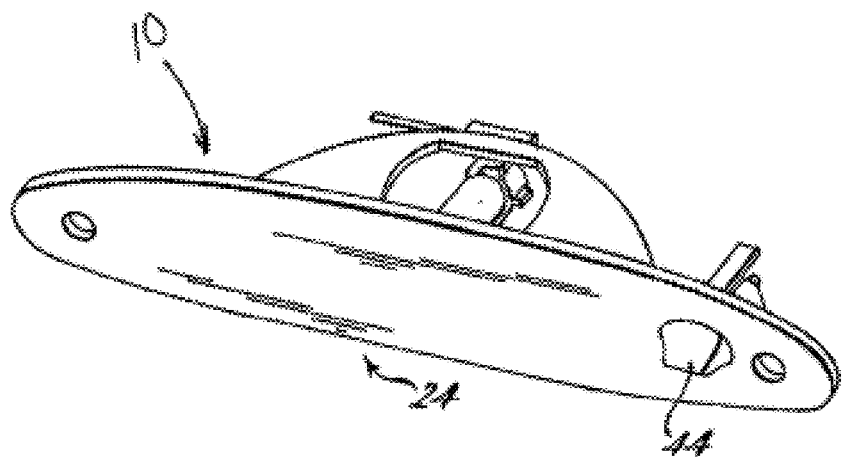
FIG. 1C is a schematic diagram illustrating an automotive imaging system with a nozzle assembly configured for cleaning the imaging system's exterior objective lens surface, in accordance with prior work.
Figure 1D:
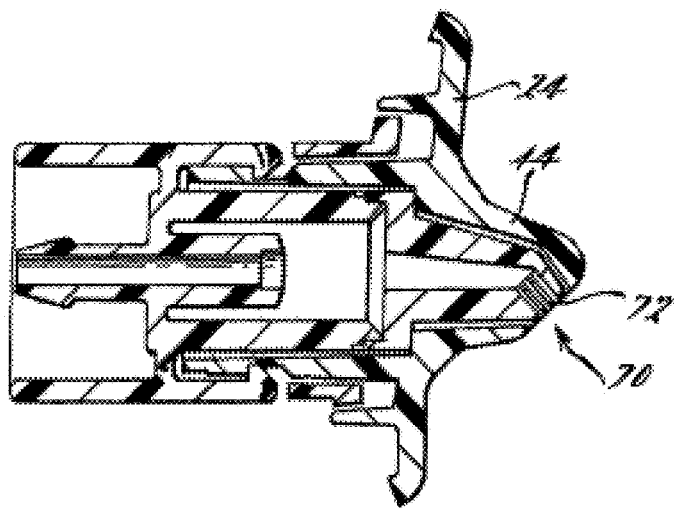
FIGS. 1D through 1G illustrate a compact split-lip shear washer nozzle for use in automotive applications in accordance with the Prior Art.
Figure 1E:
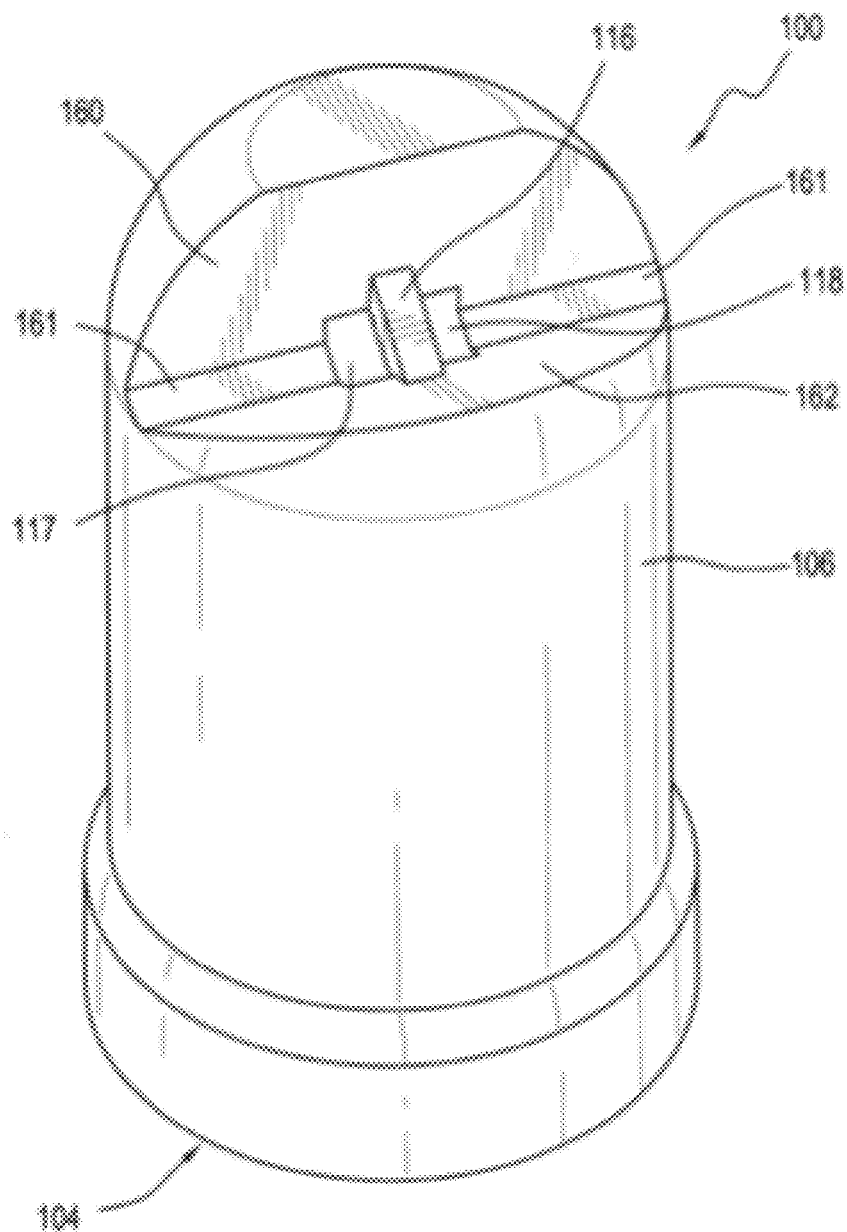
Figure 1F:
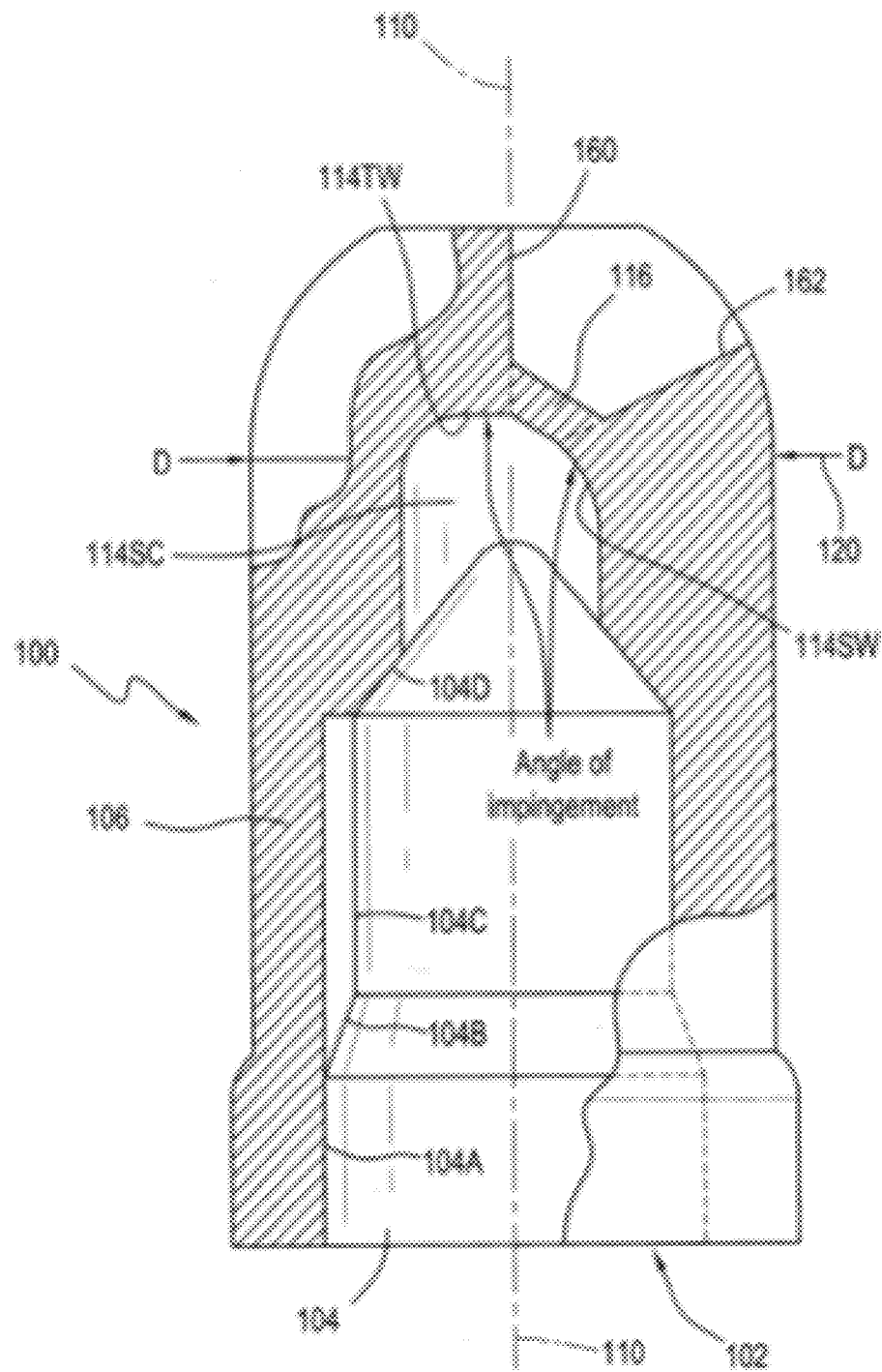
Figure 1G:
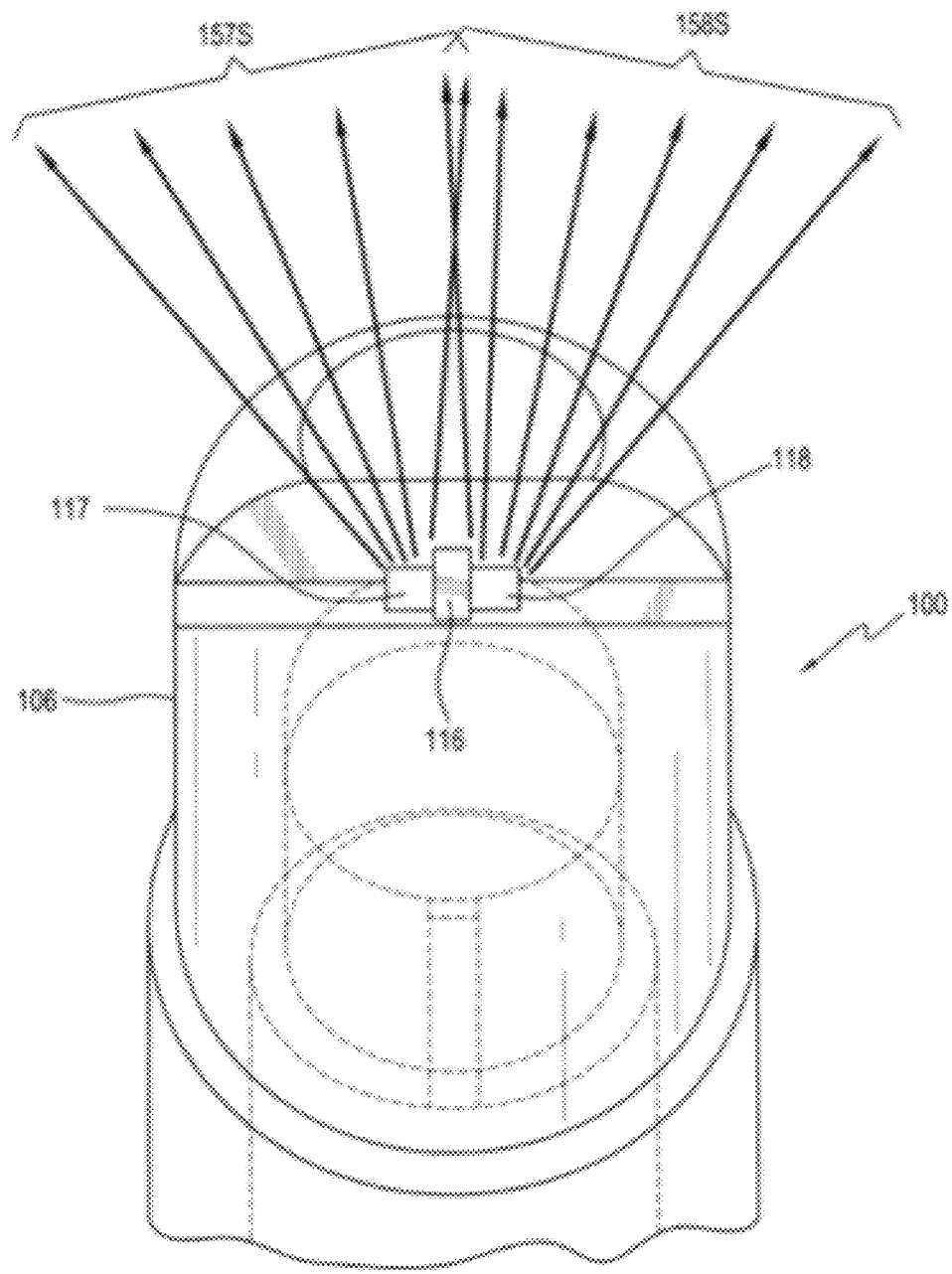
Figures 3A, 3B:
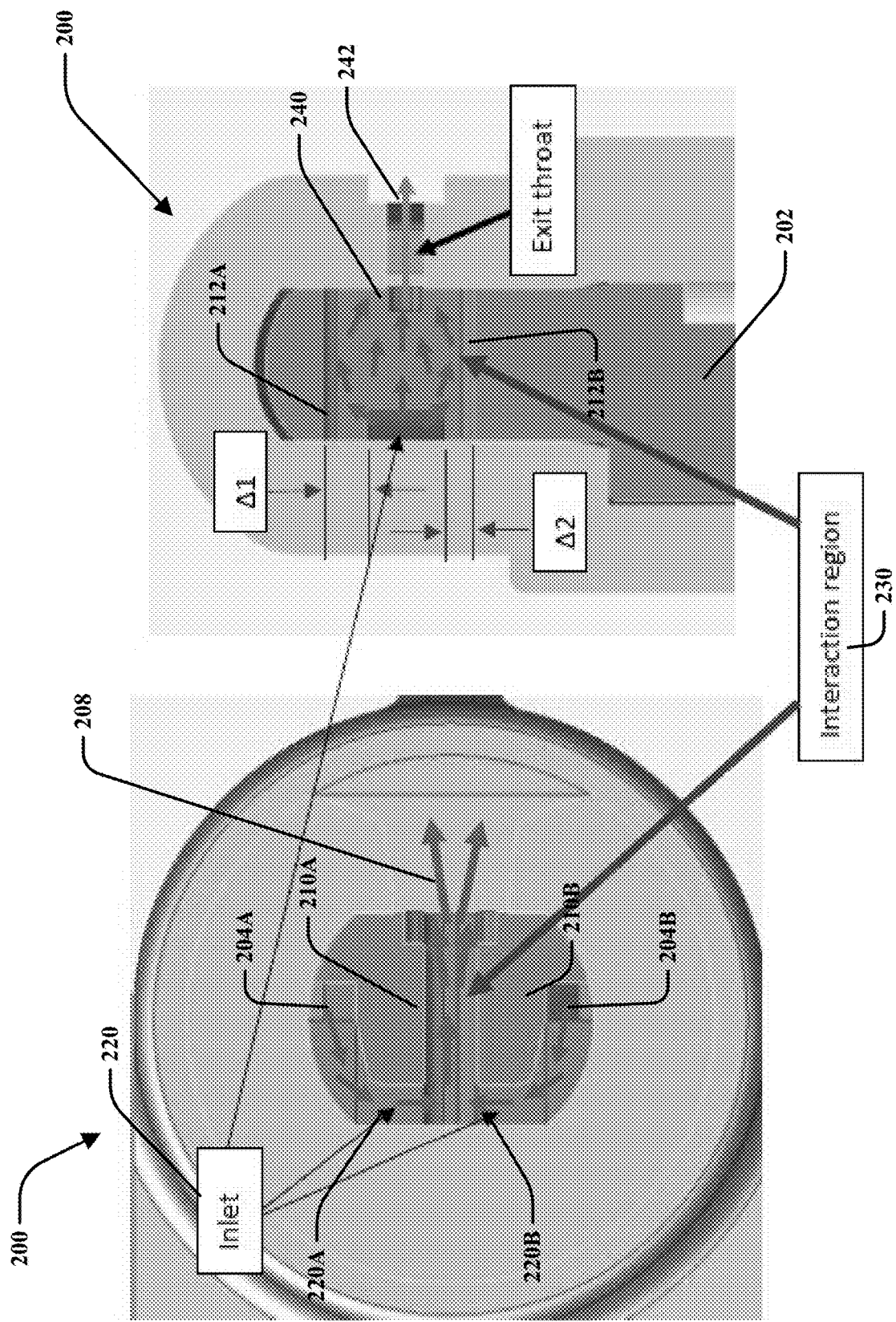
FIG. 3A illustrates an enlarged top cross sectional view through line BOB of FIG. 2A according to an embodiment of the present disclosure.
FIG. 3B illustrates an enlarged cross sectional view through line A-A of FIG. 2A according to an embodiment of the present disclosure.

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the assembly are identical in all of the figures. In the same manner, while a particular aspect of the disclosure is illustrated in these figures, other aspects and arrangements are possible, as will be explained below. Turning now to a detailed description of the nozzle assembly and compact spray nozzle member of the present disclosure the attached Figures (FIGS. 2A through 10) illustrate the various specific embodiments of the present disclosure.

In one instance, specific illustrative embodiments for the spray nozzle system and method of the present disclosure, in which a very compact nozzle assembly 200 is illustrated where such a system generates one or more aimed spray fans or patterns. The miniaturized (e.g., 5 mm diameter) shear nozzle assembly 200 of the present disclosure is optimized to provide the desired sprays from a small spray head profile. In one embodiment, the spray head of the present disclosure is any suitable height including, in one non-limiting embodiment, about 5 mm tall or less including about 4.6 mm tall or about 3 mm tall. The shear nozzle geometry of the present disclosure generates uniform spray fan (see FIGS. 4A-4C) along a spray axis in a spray fan plane which is perpendicular to the central lumen axis of the fluid inlet or feed hole (see FIGS. 3A through 3C), at a low washer fluid flow rate, while providing excellent cold performance, and easy manufacturability. In an alternative embodiment, as is illustrated in FIGS. 5A through 8C, a nozzle design according to another embodiment of the present disclosure is disclosed as configurable as a multi-spray nozzle assembly 300 capable of spraying two different oriented fans from one single nozzle. A low flow compact spray head design for cleaning applications, especially for camera lens wash comprises a miniature spay nozzle head 200 which is, in one embodiment, about 5 mm in diameter or less. Washer fluid (or some other fluid, liquid, or even air) is fed from the bottom of nozzle 200 along a nozzle assembly lumen central flow axis 202, and then the fluid is separated into two flows 204a and 204b. Flows 204a and 204b are then fed into a first power nozzle 220a and a second power nozzle 220b, where the power nozzles or inlets 220a and 220b define lumens or channels of fluid communication which make the flows turn 90°, thereby generating two jets which oppose or face each other where the flows collide or impinge upon one another inside an interaction region 230. As best seen in the two views of FIGS. 3A and 3B, uniform stream lines are generated by the two impinging or direct facing jets and converge at the nozzle throat or outlet orifice 240 to become a uniform spray fan 208, which is projected along a central spray axis on a plane perpendicular to the inlet lumen's central flow axis of cylindrical nozzle head. The shear nozzle assembly of claim 1, wherein the position of the power nozzles relative to the interaction region includes a top clearance dimension and a bottom clearance dimension wherein the top clearance dimension is greater than the bottom clearance dimension. The transverse throat of the insert member is defined partially by a first sidewall 210A, a second sidewall 210B, a floor surface 212B and a roof surface 212A. The first sidewall and second sidewall are opposite one another and are substantially planar and the floor surface and roof surface may be opposite one another and be substantially planar. The nozzle housing may include a dome-shaped tip with a diameter size of approximately 5.6 mm.

This fluidic circuit design enables miniature size low flowrate nozzle 200 to operate consistently with a low flow rate (e.g., a flow rate of about 150 mL/min to about 300 mL/min at 25 psi, or even a flow rate of about 250 mL/min at 25 psi or above, at a viscosity of about 1-25 CP) at various temperatures including cold temperatures (i.e., about −4° F. or lower) with a liquid or aqueous system including up to about 50 percent ethanol. The configuration of nozzle assembly 200 can be altered to provide a two spray embodiment (see, e.g., nozzle assembly 300) which operates on the same principals and is capable of generating two or more differently oriented spray fans (e.g., fans spraying in opposing directions) from one single nozzle assembly (see nozzle 300 as illustrated in FIGS. 5A through 8C).

The nozzle assembly method of the present disclosure provides a novel way to assemble a miniaturized (e.g., about 5 mm diameter) spray nozzle with variable spray fan in a two-piece nozzle assembly. The spray fan angle may be selected to be in the range of about 15° to about 70°. Spray aim angles may be selected to be in the range of about −15° to about +15°. In one embodiment, the system of the present disclosure operates well with washer fluid flow rates of around about 200 mL/min to about 600 mL/min at 25 psi. The nozzle assembly and method of the present disclosure provide a lens washer system capable of operating effectively with a low flow rate (e.g., a flow rate of about 150 mL/min to about 300 mL/min at 25 psi, or even a flow rate of about 250 mL/min at 25 psi or above, at a viscosity of about 25 CP) and the spray nozzle performs very well with high viscosity washer fluids (e.g., fluids containing up to about 50 percent ethanol) under cold temperatures (e.g., about −4° F. or lower).

The nozzle assembly and method of the present disclosure includes a two-piece spray nozzle assembly 200 where both housing member 206 and insert member 216 (see FIG. 2A) are economically manufacturable (e.g., by molding from plastic materials, by 3D printing, by injection molding, etc.) for high volume robust production. The nozzle assembly and method of the present disclosure may be implemented with a one nozzle spray or with two or more variously oriented spray fans. As shown in FIGS. 8A through 8C, nozzle assembly 300 is configurable to generate first and second separate spray fans aimed along diverging or opposing spray axes to clean first and second separate and differently oriented camera lens surfaces.

Figure 4A:
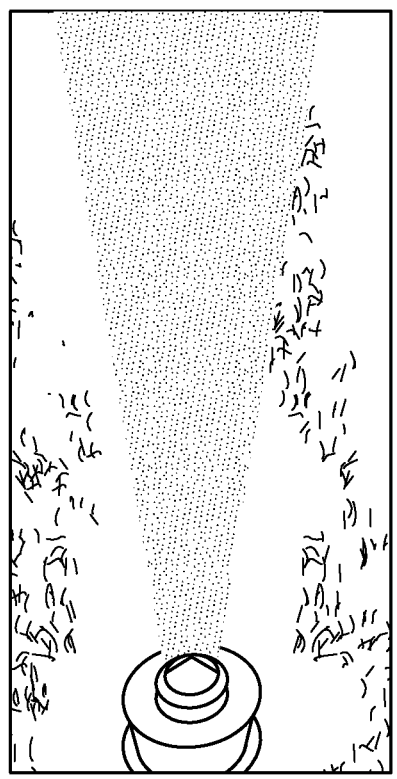
FIG. 4A is a photograph illustrating a top view of a spray nozzle according to one embodiment of the present disclosure operating at room temperature and with a nozzle flow rate of about 250 ml/min at 25 psi.
Figure 4B:
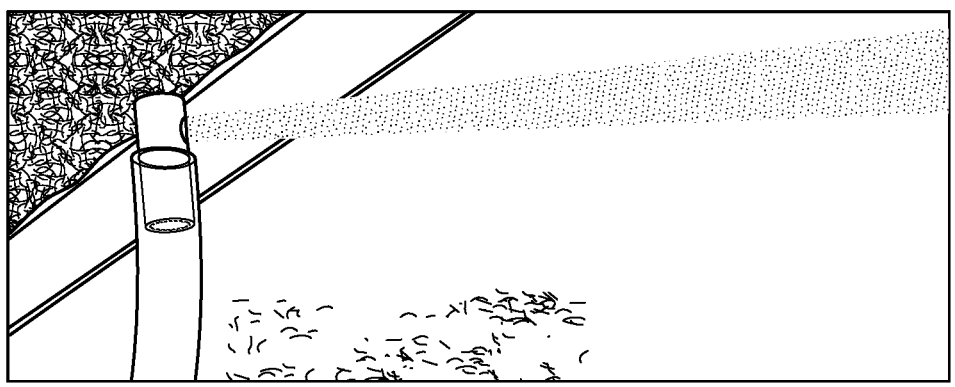
FIG. 4B is a photograph illustrating a side view of a spray nozzle according to one embodiment of the present disclosure operating at room temperature and with a nozzle flow rate of about 250 ml/min at 25 psi.
Figure 4C:
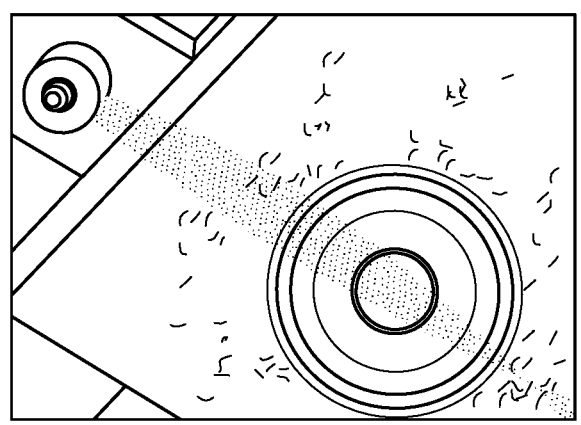
FIG. 4C is a photograph illustrating a top view of a spray nozzle according to one embodiment of the present disclosure operating at about −4 degrees F. with a nozzle flow rate of about 250 ml/min at 25 psi and a 50% ethanol fluid spray.
Figure 5B:
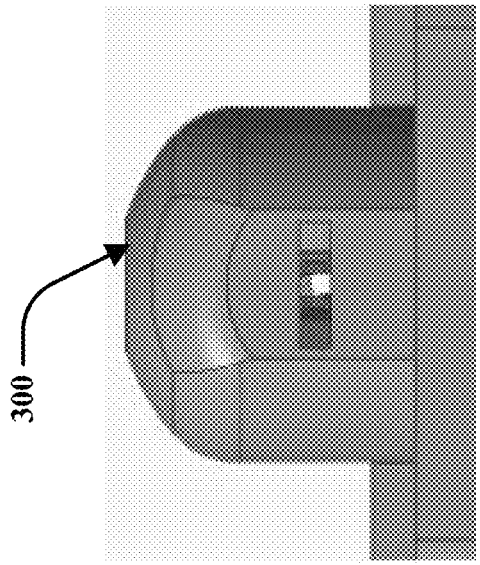
FIG. 5B illustrates a front view of the nozzle assembly of FIG. 5A.
Figure 5C:
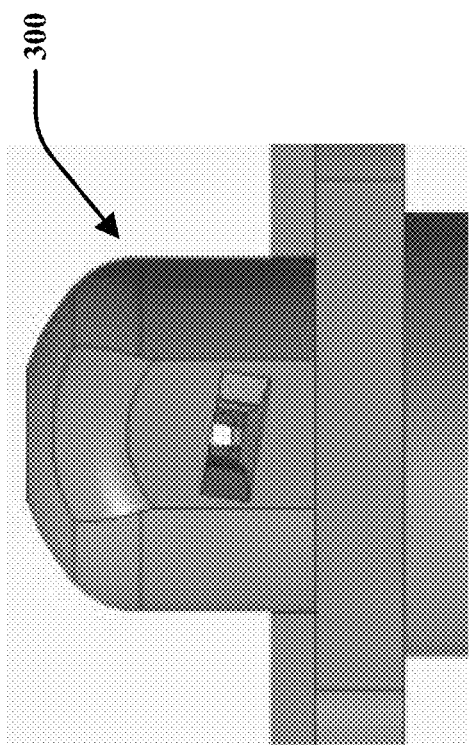
FIG. 5C illustrates a rear view of the nozzle assembly of FIG. 5A.
Figure 5A:
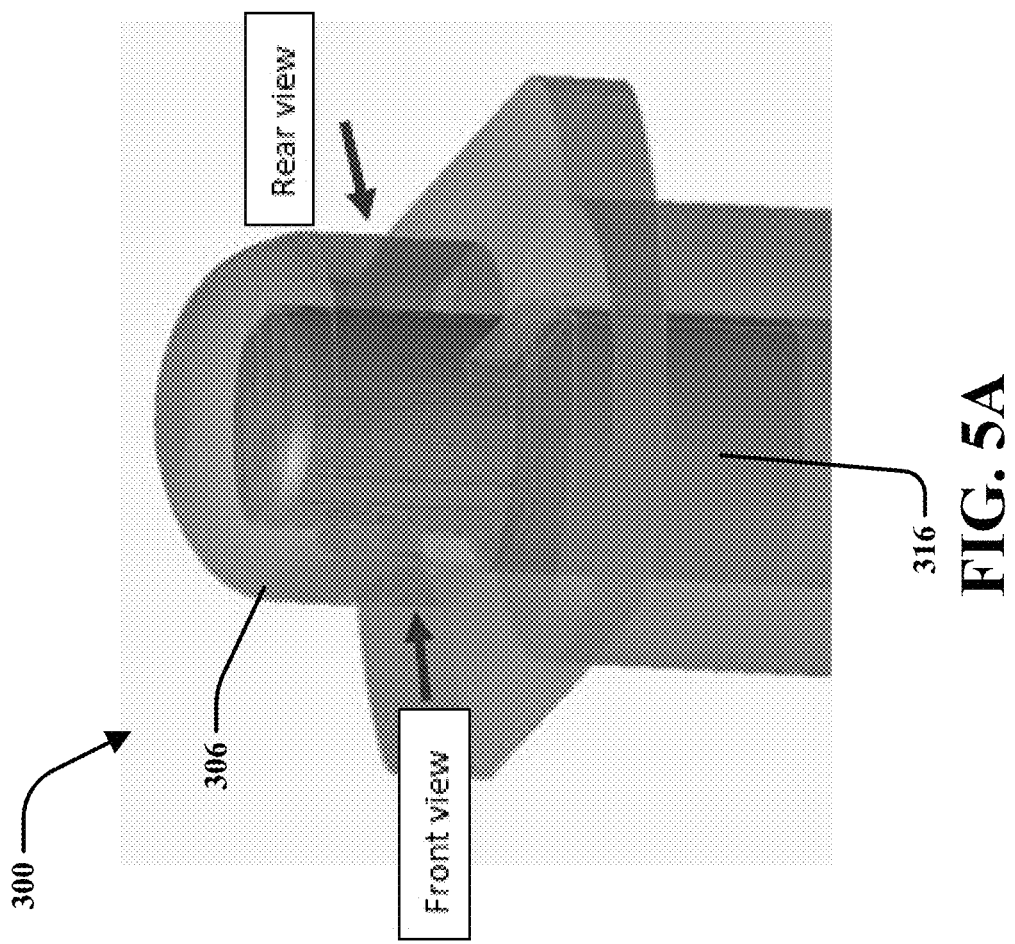
FIG. 5A is a perspective view of a spray nozzle according to another embodiment of the present disclosure where the nozzle of FIG. 5A has the ability to yield two or more spray fans.

Returning to FIGS. 3A and 3B, in operation, two flows from first and second inlets or power nozzles 220a and 220b enter interaction region 230 from opposite directions, and the impinging or colliding flows produce shear shape stream lines flowing distally along the interaction region's central spray axis toward exit orifice or throat 240 to form a flat fan spray 208 (as is illustrated in FIGS. 4A through 4C). The exit side throat 240, best seen in FIG. 3A, forms the desired spray fan shape and reduces failure of such a small nozzle while operating in cold ambient conditions. The spray would be a jet without the fluidic effects generated via operation of exit side throat 240. In one embodiment, nozzle assembly 200 of the present disclosure is capable of reliably generating a satisfactory spray fan when fan inlet supply fluid is supplied at a low flow rate (e.g., a flow rate of about 150 mL/min to about 300 mL/min at 25 psi, or even a flow rate of about 250 mL/min at 25 psi or above, at a viscosity of up to about 25 CP). Additionally, spray nozzle 200 performs very well even under cold temperatures of about −4° F. or lower (see, e.g., FIG. 3) with a fluid/aqueous liquid having a high viscosity (e.g., a washer fluid comprising about 50 percent ethanol and about 50 percent water).

Another advantage of the nozzle and method of the present disclosure is that the insert member (e.g., 216) is injection-mold friendly or even 3D printing friendly, robust for manufacturing, assembling, retention and sealing. For each power nozzle 220a and/or 220b the lumen cross sectional area or inlet size is, in one non-limiting instance, about 1 mm by about 0.4 mm. In this instance, the typical interaction region width is in the range of about 0.4 mm to about 0.6 mm. The exit throat or outlet orifice 240 (as illustrated from the side in FIGS. 2B and 3B) is axially aligned with and sprays through a side aperture 242 in housing member 206.

In one embodiment, typical exit throat size is around about 0.5 mm by about 1 mm. The power nozzle lumen area or inlet size is big compared to the exit throat in order to reduce restrictions and turbulence in (e.g., comfort) the flows fed from the bottom opening or housing inlet orifice. In order to balance the upward vector of feed flow inside the interaction region 230 (as best seen in the two views of FIG. 2B), top clearance (denote d by Δ1) is greater than bottom clearance (denoted by Δ2). This inlet feed condition assists to maintain a stable spray.

In one embodiment, the spray fan is adjustable for different washing applications by adjusting the ratio of the exit throat area 240 and exit side throat 242. The distance between the inlet and exit throat also affects the spray fan. Spray aim angle may also be changed by making an offset between the exit side throat 242 and the exit throat with an added a down draft angle to the exit top or bottom surface (see, e.g., FIG. 7). Spray thickness will increase when the exit throat is diverged by drafted top/bottom exit surface (see, e.g., FIG. 7).

Figure 7:
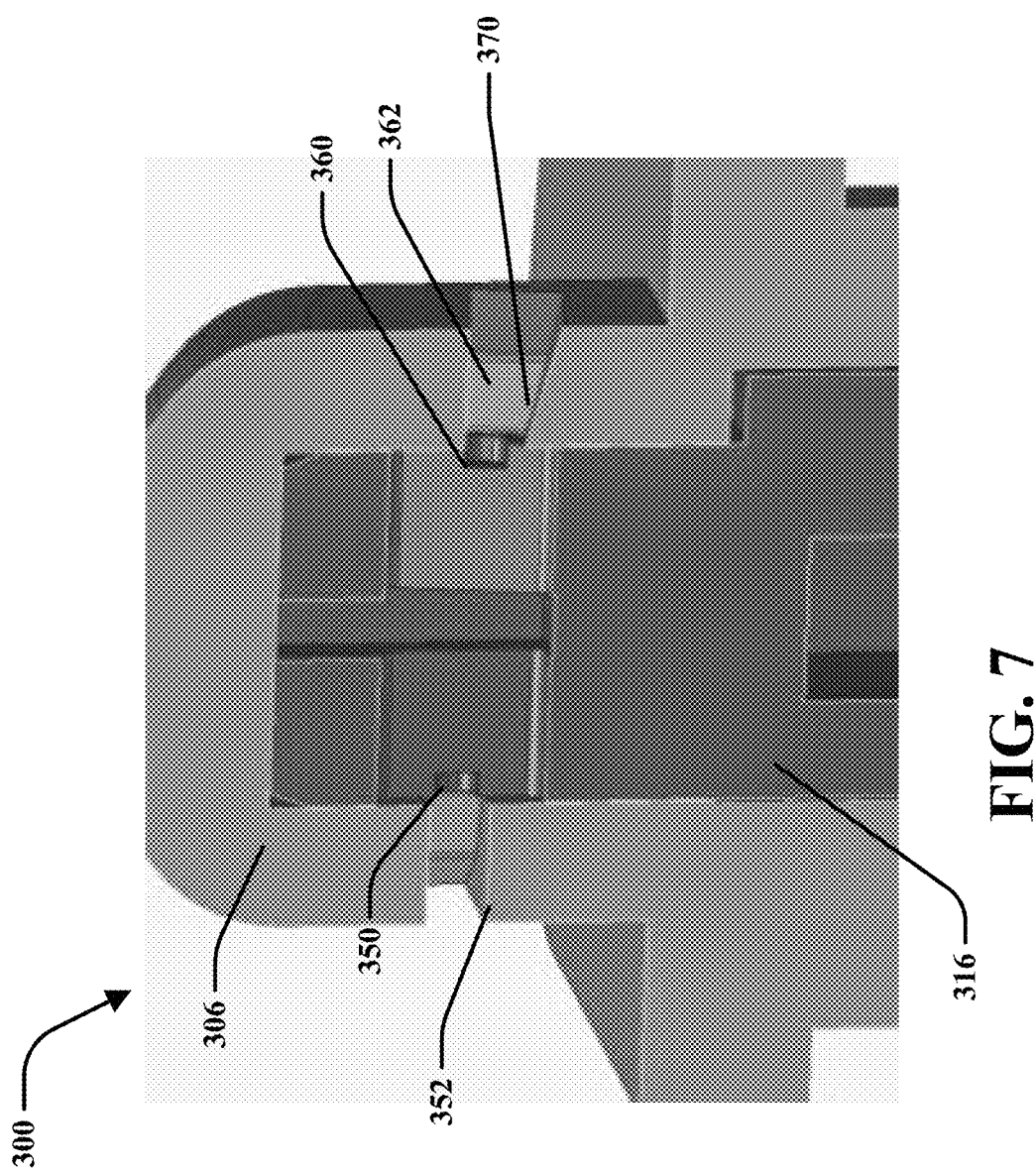
FIG. 7 is a cross sectional view of an embodiment of the spray nozzle according to the present disclosure.
Figure 9:
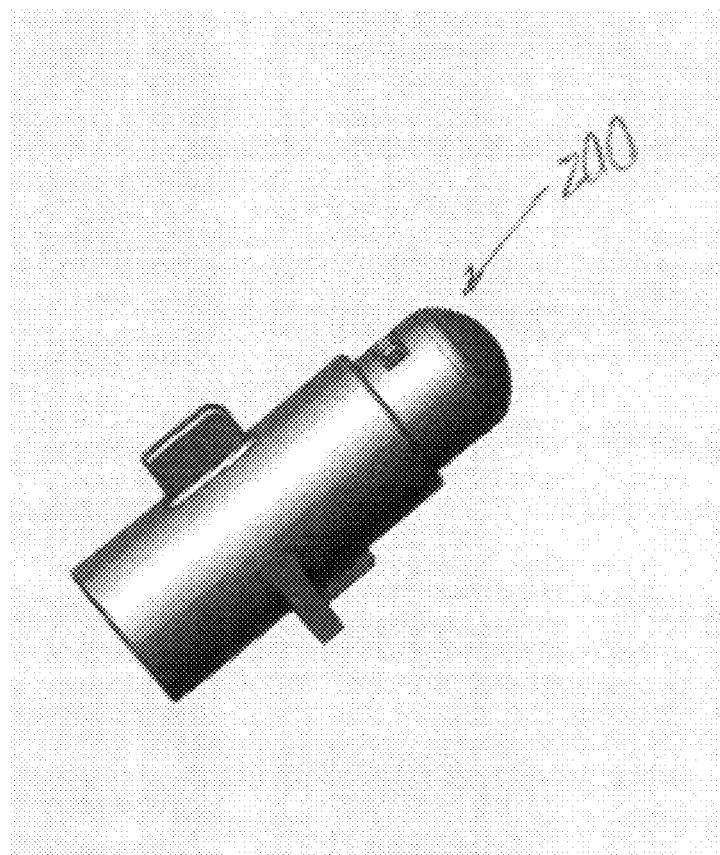
FIG. 9 is a perspective view of a nozzle assembly according to an embodiment of the present disclosure.

As illustrated in FIGS. 5A through 8C, these Figures show a multi-spray nozzle assembly 300 with housing 306 and insert 316, the circuit design of the present disclosure can make one single nozzle assembly which aims and generates two or more separate spray fans with diverging or opposing spray axes to wash lenses or other surfaces having differing orientations. In this embodiment, there are no power nozzles but an interior lumen 320 that extends within the insert 316. The interior lumen 320 allows fluid to flow therethrough and split along center member 330 into a first entry lumen 322A and a second entry lumen 322B in direct communication with interaction region 340. Notably the area of the first and second entry lumens 322A, 322B are larger than the interaction region 340. First outlet 350 and second outlet 360 extend opposite one another from the interaction region 340 and are configured to align with first exit outlet 352 and second exit outlet 362 as illustrated by FIG. 7.

For the exemplary embodiment illustrated in FIGS. 8A through 8C, the spray orientation of a first spray from first outlet 350 and first exit outlet 352 is: aim=0°, roll 0°, while the spray orientation of a second spray from second outlet 360 and second exit outlet 362 is: aim=−10°, roll=10°. The 10° roll angle is achieved by rolling the interaction region's cross sectional slot-shaped lumen along the second outlet 360 (see FIGS. 6A, 6B, 6C). The −10° aim angle is achieved by offset of the second outlet 360 and second exit outlet 362 in the housing 306 and a down draft at bottom exit floor 370. Both housing 206, 306 and insert 216, 316 designs are molding friendly. The separation angle or the angle between the first and second spray axes of the nozzle shown in FIGS. 5A through 8C (between two spray fans) is 180°. This separation angle could be about 30°, about 45°, about 90° or even any other angle depending on the package size of the nozzle. Applicant's development work on the nozzle assembly of the present disclosure (e.g., 200, 300) indicates that the nozzles of the present disclosure also work with oil, air or other fluids.

Although the embodiments of the present disclosure have been illustrated in the accompanying drawings and described in the foregoing detailed description, it is to be understood that the present disclosure is not to be limited to just the embodiments disclosed, but that the present disclosure described herein is capable of numerous rearrangements, modifications and substitutions without departing from the scope of the claims hereafter. The claims as follows are intended to include all modifications and alterations insofar as they come within the scope of the claims or the equivalent thereof.

Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A low-flow, fluid conserving shear nozzle assembly, comprising:
    an insert member having two opposed power nozzles that are configured to be in fluid communication with an exit orifice or throat and an interaction region formed in the insert member, the exit orifice or throat located at an end opposite from where the two opposed power nozzles meet the interaction region; and
    a nozzle housing enclosing an interior volume along an inlet axis which receives the insert member, the nozzle housing including a lateral side wall aperture,
    wherein the two opposed power nozzles are defined by the insert member and the nozzle housing and the two opposed power nozzles are configured to receive pressurized fluid such that the pressurized fluid flows into the two opposed power nozzles so that a first fluid flow and a second fluid flow are created and are aimed by the two opposed power nozzles into the interaction region, and
    wherein the lateral side wall aperture is in communication with the interaction region of the insert member and wherein the lateral side wall aperture is defined through a sidewall in the nozzle housing for creating, issuing or permitting a uniform spray fan on a plane generally perpendicular to the inlet axis of said nozzle housing to emanate from the lateral side wall aperture.

2. The shear nozzle assembly of claim 1, wherein the interaction region is substantially rectangular and defined by sidewalls within the insert member wherein the sidewalls project upwardly from a planar floor surface.

3. The shear nozzle assembly of claim 1, wherein the lateral side wall aperture is aligned along a spray axis, wherein the spray axis is generally perpendicular to the inlet axis of the nozzle housing wherein the insert member and the nozzle housing extend along the inlet axis.

4. The shear nozzle assembly of claim 3, wherein pressurized fluid is introduced to at least one fluid passage adjacent a distal end of the insert member, where the two opposed power nozzles and the interaction region are positioned adjacent a proximal end of the insert member such that the distal end and proximal end align along the inlet axis.

5. The shear nozzle assembly of claim 1, wherein the insert member includes sidewall features defining filter post arrays to filter pressurized fluid passing into and though the interior volume of the housing and into the two opposed power nozzles.

6. The shear nozzle assembly of claim 1, wherein the insert member is received within a bottom opening of the nozzle housing and permits fluid to flow into the interior volume of the nozzle housing around the insert member.

7. The shear nozzle assembly of claim 1, wherein the position of the two opposed power nozzles relative to the interaction region includes a top clearance dimension and a bottom clearance dimension wherein the top clearance dimension is greater than the bottom clearance dimension.

8. The shear nozzle assembly of claim 1, wherein the interaction region of the insert member is defined partially by a first sidewall, a second sidewall and a floor surface.

9. The shear nozzle assembly of claim 8, wherein the first sidewall and second sidewall are opposite one another and are substantially planar.

10. The shear nozzle assembly of claim 1, wherein the nozzle housing includes a dome-shaped tip with a diameter size of approximately 5.6 mm.

11. The shear nozzle assembly of claim 1, wherein the nozzle assembly issues the uniform spray fan having aim angles between about minus 10 degrees to about plus 10 degrees from the plane generally perpendicular to the inlet axis of said nozzle housing, with a low flow rate of about 150 mL/min to about 300 mL/min at 25 psi, and is capable of reliably initiating spraying liquids having a viscosity from about 1 CP up to about 25 CP.

12. The shear nozzle assembly of claim 4, wherein the at least one fluid passage is defined by features located along an outer surface of the insert member and an inner surface of the nozzle housing.

13. The shear nozzle assembly of claim 1, wherein the insert member further comprises a first lateral inlet and a second lateral inlet formed along an outer surface of the insert member, wherein the first lateral inlet and the second lateral inlet are in communication with the two opposed power nozzles.

14. A method of assembling a low-flow miniature shear nozzle assembly comprising:
   providing a nozzle housing enclosing an interior volume along an inlet axis and including an aperture along a sidewall of the nozzle housing;
   forming an elongated insert member having two opposed power nozzles that are in fluid communication with an interaction region of the elongated insert member, the interaction region having an exit orifice or exit throat located at an end opposite where the two opposed power nozzles meet the interaction region;
   receiving, in the interior volume of the nozzle housing, the insert member wherein at least one fluid passage is defined by the insert member and the nozzle housing; and
   aligning the interaction region of the insert member with the aperture of the nozzle housing wherein the at least one fluid passage is in fluid communication with said two opposed power nozzles that are in fluid communication with the interaction region for issuing a uniform spray fan on a plane generally perpendicular to the inlet axis of said nozzle housing to emanate from the aperture.

15. The method of assembling a low-flow miniature shear spray nozzle assembly of claim 14, wherein the step of forming the insert member further comprises positioning the two opposed power nozzles relative to the interaction region to include a top clearance dimension and a bottom clearance dimension wherein the top clearance dimension is greater than the bottom clearance dimension.

\* \* \* \* \*